United States Patent
Gumaste et al.

(10) Patent No.: US 7,466,917 B2
(45) Date of Patent: Dec. 16, 2008

(54) METHOD AND SYSTEM FOR ESTABLISHING TRANSMISSION PRIORITY FOR OPTICAL LIGHT-TRAILS

(75) Inventors: Ashwin Anil Gumaste, Dallas, TX (US); Susumu Kinoshita, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 413 days.

(21) Appl. No.: 11/080,051

(22) Filed: Mar. 15, 2005

(65) Prior Publication Data

US 2006/0210268 A1    Sep. 21, 2006

(51) Int. Cl.
    *H04B 10/20* (2006.01)
(52) U.S. Cl. .............................. 398/59; 398/57; 398/58
(58) Field of Classification Search .................. 398/19, 398/25, 30–33, 58, 57, 59
    See application file for complete search history.

(56) References Cited

U.S. PATENT DOCUMENTS

| | | | |
|---|---|---|---|
| 4,651,316 A | 3/1987 | Kocan et al. | 370/462 |
| 5,258,978 A | 11/1993 | Cloonan et al. | 370/411 |
| 5,469,428 A | 11/1995 | Tokura et al. | |
| 5,724,166 A | 3/1998 | Nakata | |
| 5,854,700 A | 12/1998 | Ota | |
| 5,903,371 A | 5/1999 | Arecco et al. | |
| 6,160,648 A | 12/2000 | Oberg et al. | |
| 6,169,746 B1 | 1/2001 | Ueda et al. | 370/466 |
| 6,195,186 B1 * | 2/2001 | Asahi | 398/5 |
| 6,504,849 B1 | 1/2003 | Wang et al. | 370/455 |
| 6,567,194 B1 | 5/2003 | Badr | 398/1 |
| 6,594,232 B1 | 7/2003 | Dupont | |
| 6,631,134 B1 | 10/2003 | Zadikian et al. | |
| 6,701,085 B1 | 3/2004 | Muller | |

(Continued)

FOREIGN PATENT DOCUMENTS

WO    WO 03/104849 A2    12/2003

OTHER PUBLICATIONS

Banaerjee et al., "Generalized Multiprotocol Label Switching: An Overview of Routing and Management Enhancements," IEEE Communications Magazine, Jan. 2001, pp. 144-149.

Bertsekas, Dimitri, "The Auction Algorithm: A Distributed Relaxation Method for the Assignment Problem," Report LIDS-P-1653, Mar. 1987, Revised Sep. 1987, pp. 1-27.

Chlamtac et al., "Bandwidth Management in Community Networks," Center for Advance Telecommunications Systems and Services, pp. 1-11, 2002, IWDC, LNCS 2571.

(Continued)

*Primary Examiner*—Dzung D Tran
(74) *Attorney, Agent, or Firm*—Baker Botts L.L.P.

(57) ABSTRACT

An optical network is operable to carry optical traffic in a plurality of wavelengths between a plurality of nodes. The optical network includes a light-trail, a convener node, one or more intervening nodes, and an end node. The light-trail is established in the optical network between the convener node and the end node and couples the convener node, the intervening nodes, and the end node. Furthermore, the light-trail is associated with one of a plurality of wavelengths.

The convener node and the intervening nodes are each operable to determine whether another node having a higher priority is transmitting optical traffic on the light-trail and, in response to determining that no node having a higher priority is transmitting on the light-trail, transmit optical traffic to one of the nodes in the light-trail. The convener node and the intervening nodes are each further operable to indicate to one or more nodes on the light-trail that optical traffic is being transmitted on the light-trail.

18 Claims, 5 Drawing Sheets

U.S. PATENT DOCUMENTS

| | | | |
|---|---|---|---|
| 6,728,484 | B1 | 4/2004 | Ghani .................. 398/42 |
| 6,766,113 | B1 | 7/2004 | Al-Salameh et al. |
| 6,775,477 | B2 | 8/2004 | Badr ..................... 398/1 |
| 6,795,394 | B1 | 9/2004 | Swinkels et al. |
| 6,850,711 | B2 | 2/2005 | Tsuruta ................. 398/168 |
| 6,882,799 | B1 | 4/2005 | Beshai et al. |
| 6,889,007 | B1 | 5/2005 | Wang et al. ............ 398/79 |
| 7,016,363 | B1* | 3/2006 | Reed et al. ............. 370/404 |
| 7,023,796 | B2 | 4/2006 | De Girolamo et al. |
| 7,031,299 | B2 | 4/2006 | Chaudhuri et al. |
| 7,088,920 | B2 | 8/2006 | Krishnaswamy et al. |
| 7,184,663 | B2 | 2/2007 | Kinoshita et al. |
| 7,218,854 | B1 | 5/2007 | Unitt et al. |
| 7,266,296 | B2 | 9/2007 | Ovadia et al. |
| 7,308,198 | B1 | 12/2007 | Chudak et al. |
| 2002/0114030 | A1 | 8/2002 | Dwivedi et al. |
| 2003/0189920 | A1 | 10/2003 | Erami et al. |
| 2003/0223104 | A1 | 12/2003 | Kinoshita et al. |
| 2003/0223682 | A1 | 12/2003 | Kinoshita et al. |
| 2003/0235153 | A1 | 12/2003 | Lee et al. |
| 2004/0034753 | A1 | 2/2004 | Jeddeloh |
| 2004/0052530 | A1 | 3/2004 | Tian et al. |
| 2004/0234263 | A1 | 11/2004 | Ovadia et al. |
| 2004/0252995 | A1 | 12/2004 | Ovadia et al. |
| 2005/0013613 | A1 | 1/2005 | Stevenson et al. |
| 2005/0088964 | A1 | 4/2005 | Yang et al. |
| 2005/0191054 | A1 | 9/2005 | Aoki et al. |
| 2006/0013584 | A1* | 1/2006 | Miyazaki ............... 398/19 |
| 2006/0056279 | A1 | 3/2006 | Pronk et al. |
| 2006/0188258 | A1 | 8/2006 | Gumaste et al. |
| 2006/0210273 | A1 | 9/2006 | Gumaste et al. |
| 2006/0222360 | A1 | 10/2006 | Gumaste et al. |
| 2006/0228112 | A1 | 10/2006 | Gumaste et al. |
| 2006/0245755 | A1 | 11/2006 | Gumaste et al. |
| 2007/0019662 | A1 | 1/2007 | Gumaste et al. |
| 2007/0047958 | A1 | 3/2007 | Gumaste et al. |
| 2007/0121507 | A1* | 5/2007 | Manzalini et al. ........ 370/235 |
| 2007/0255640 | A1 | 11/2007 | Gumaste et al. |

OTHER PUBLICATIONS

Chlamtac et al., Lightpath Communications: An Approach to High Bandwidth Optical WAN's, IEEE Transactions on Communications, vol. 40, No. 7, Jul. 1992, pp. 1171-1182.

Chlamtac et al., "Light-Trails: A Solution to IP Centric Communication in the Optical Domain," 11 pages, Center for Advance Technology Systems and Services, University of Texas at Dallas, Texas 75083, USA, Quality of Service in Multiservice IP Networks, Second International Workshop, QoS-IP Feb. 2003.

Dolzer et al., "Evaluation of Reservation Mechanisms for Optical Burst Switching," 8 pages, 2001, AEU Int. J. Electron. Commun. 55 No. 1, 1-1.

Fang et al., "Optimal Light Trail Design in WDM Optical Networks," IEEE Communications Society, 2004 IEEE, pp. 1699-1703.

Foster, "The Grid Blue Print for a New Computing Infrastructure," Morgan Kauffman, Nov. 1998, pp. 479-532.

Frederick et al., "Light Trials: A Sub-Wavelength Solution for Optical Networking," 2004 IEEE, 2004 Workshop on High Performance Switching and Routing, Apr. 19-21, 2004.

Fumagalli et al., "The Multi-Token Inter-Arrival Time (MTIT) Access Protocol for Supporting IP over WDM Ring Network," 1999 IEEE, pp. 586-590.

Ghani et al., "On IP-Over-WDM Integration," IEEE Communications Magazine, Mar. 2000, pp. 72-84, WDM Optical Networks: A Reality Check.

Gumaste et al., "A Scheduling Procedure for Control Signaling in Optical Burst Switched Network," in Proceedings for the First International Conference on Optical Communication and Networks, Nov. 11-14, 2002, pp. 190-193.

Gumaste et al., Bifurcated Traffic and Channel Assignment (BITCA) to Interconnected Metro Rings, 3 pages, OFC 2002.

Gumaste et al., "Light-Frames: A Pragmatic Framework for Optical Packet Transport," IEEE Communications Society, pp. 1537-1542, 2004.

Gumaste et al., "Light-Trail and Light-Frame Architectures for Optical Networks," PHD Thesis, University of Texas Dallas, Dec. 2003.

Gumaste et al., "Light-Trails: A Novel Conceptual Framework for Conducting Optical Communications," Center for Advanced Telecommunications Services and Studies, 7 pages, 2003.

Gumaste et al., Light Trails: An Optical Solution for IP Transport, J. Opt. Net., vol. 3, 2004, pp. 261-281, Center for Advanced Telecommunications Systems and Services, The University of Texas at Dallas, May 2004, vol. 3, No. 5, Journal of Optical Networking, pp. 261-281.

Gumaste et al., "Heuristic Optimal Techniques for Light-Trail Assingment in Optical WDM Networks," Photonics Networking Laboratory, 7 pages, unknown.

Gumaste et al., Mesh Implementation of Light Trails: A Solution to IP Centric Communication, 6 pages, Center for Advanced Telecommunications Services and Studies, unknown.

Gumaste et al., "Next-Generation Optical Storage Area Networks: The Light-Trails Approach," Optical Storage Area Networks, IEEE Communications Magazine, Mar. 2005, pp. 72-79.

Gumaste et al., "Optimizing Light-Trail Assignment to WDM Networks for Dynammic IP Centric Traffic," pp. 113-118, unknown.

Gumaste et al. Performance Evaluation and Demonstration of Light Trails in Shared Wavelength Optical Networks (SWONSs), 2 pages, date unknown.

Gumaste et al., "Providing Bandwidth on Demand to End-Users by Adaptations to a GMPLS Framework: The Light-Trails Approach," National Fiber Optics Engineers Conference, 2003 Technical Proceedings, pp. 1137-1141.

Gumaste et al., "Optical Implementation of Resilient Packet Rings Using Light-Trails," Advanced Computer Network and Architecture Laboratory, 7 pages, unknown.

Humblet, "Models of Blocking Probability in All-Optical Networks With and Without Wavelength Changers," IEEE Journal on Selected Areas in Communications, Jun. 1996, vol. 14, No. 5, ISACEM, 11 pages.

Kinoshita, S.. "Broadband Fiber Optic Amplifiers," OFC 2001, Optical Fiber Communications Conference and Exhibit, Mar. 17-22, 2001, 5 pages.

Ota et al., "High-Speed, Burst-Mode, Packet-Capable Optical Receiver and Instantaneous Clock Recovery for Optical Bus Operation," Journal of Lightwave Technology, vol. 12, No. 2, Feb. 1994, pp. 325-331.

Qiao et al., "On an IP-Centric Optical Control Plane" Intelligence in Optical Networks, IEEE Communication Magazine, Sep. 2001, pp. 88-93.

Ramaswami et al., "Routing and Wavelengths Assignment in All-Optical Networks," IEEE/ACM Transactions on Networking, Oct. 1995, vol. 5, No. 3, pp. 489-500.

Resilient Packet Ring Alliance, "An Introduction to Resilient Packet Ring Technology," A White Paper by the Resilient Packet Ring Alliance, Oct. 2001, pp. 1-16.

Sahasrabuddhe et al., "Fault Management on IP-Over-WDM Networks: WDM Protection versus IP Restoration," IEEE Journal on Selected Areas in Communications, vol. 20, No. 1, Jan. 2002, pp. 21-33.

Sasaki et al., "The Interface Between IP and WDM and Its Effect on the Cost of Survivability," IEEE Communications Magazine, Jan. 2003, World Telecommunications Congress 2002 (WTC 2002), pp. 74-79.

Shrinkhande et al., "CSMA/CA MAC Protocols for IP Hornet: An IP Hornet: An IP Over WDM Metropolitan Area Ring Network," Stanford University Optical Communications Research Laboratory, 5 pages, 2000.

Spadaro et al., "Positioning of the RPR Standard in Contemporary Operator Environments," 10 pages, unknown.

Tancevski et al., "Optical Routing as Asynchronous, Variable Length Packets," IEEE Journal on Selected Areas in Communications, vol. 18, No. 10, Oct. 2000, pp. 2084-2093.

Verma et al., "Optical Burst Switching: A Viable Solution for Terabit IP Backbone," IEEE Network Magazine, vol. 14, No. 6, Nov./Dec. 2000, pp. 48-53.

Yoo et al., "Just Enough Time (JET): A High Speed Protocol for Bursty Traffic in Optical Networks,:" Proc. IEE/LEOS Tech. GII, Aug. 1997, pp. 26-27.

Yener et al., "Flow Trees: A Lower Bound Computation Tool for Network Optimization," Columbia Tool for Network Optimization, Columbia Univ. Tech. Rep. CUCS-006-94, unknown.

Zhang et al., "Differentiated Multi Layer Survivability in IP/WDM Networks," in Networks Operations and Management Symposium, IEEE, New York, 2002, pp. 681-696.

Zhang et al., "A Heuristic Wavelength Assignment Algorithm for Multihop WDM Networks with Wavelength Routing a Wavelength Reuse," in Proc. INFOCOM 94, 1994, pp. 534-543.

Gumaste, "System and Method for Implementing Optical Light-Trails," U.S. Appl. No. 11/080,752, filed Mar. 15, 2005.

Gumaste, "System and Method for Bandwidth Allocation in an Optical Light-Trail," U.S. Appl. No. 11/218,262, filed Aug. 13, 2005.

Gumaste, "System and Method for Transmission and Reception of Traffic in Optical Light-Trails," U.S. Appl. No. 11/095,246, filed Mar. 30, 2005.

Gumaste, "System and Method for Protecting Optical Light-Trails," U.S. Appl. No. 11/098,720, filed Apr. 4, 2005.

Gumaste, "System and Method for Shaping Traffic in Optical Light-Trails," U.S. Appl. No. 11/118,899, filed Apr. 29, 2005.

Gumaste, "Heuristical Assignment of Light-Trails in a Optical Netowrk," U.S. Appl. No. 11/185,958, filed Jul. 19, 2005.

Gumaste, "System and Method for Bandwidth Allocation in an Optical Light-Trail," U.S. Appl. No. 11/380,812, filed Apr. 28, 2006.

U.S. Appl. No. 11/061,255 entitled, "Method and System for Time-Sharing Transmission Frequencies in a Optical Network," filed Feb. 18, 2005, 45 pages.

Dutton et al., "Understanding Optical Communications," IBM International Technical Support Organization, Sep. 1998, p. 9, 366, and 367 (3 pages).

Ramaswami et al., "Optical Networks: A Practical Perspective," First Edition, Morgan Kauffman Publications, 1998, pp. 423-462 (41 total pages).

Maille et al., "Multi-Bid Auctions for Bandwidth Allocation in Communications Networks," INFOCOM 2004, Mar. 7-11, 2004, vol. 4, pp. 54-65.

Chiang et al., "Balancing Supply and Demand of Bandwidth in Wireless Cellular: Networks: Utility Maximization Over Powers and Rates," INFOCOM 2004, Mar. 7-11, 2004, vol. 4, pp. 2800-2811.

* cited by examiner

METHOD AND SYSTEM FOR ESTABLISHING TRANSMISSION PRIORITY FOR OPTICAL LIGHT-TRAILS

TECHNICAL FIELD

The present invention relates generally to optical networks and, more particularly, to a method and system for establishing priority for use of a light-trail in an optical communication network.

BACKGROUND

Telecommunication systems, cable television systems, and data communication networks use optical networks to rapidly convey large amounts of information between remote points. In an optical network, information is conveyed in the form of optical signals through optical fibers. Optical fibers comprise thin strands of glass capable of transmitting optical signals over long distances with very low loss of signal strength.

Recent years have seen an explosion in the use of telecommunication services. As the demand for telecommunication services continues to grow, optical networks are quickly becoming overburdened by the increasing amount of information communicated over such networks. The addition of new networks or the expansion of existing networks may however be too costly to be practical solutions to this problem. Thus, efficient use of network resources has become an important goal in developing and operating optical networks.

Optical networks often employ wavelength division multiplexing (WDM) or dense wavelength division multiplexing (DWDM) to increase transmission capacity. In WDM and DWDM networks, a number of optical channels are carried in each fiber at disparate wavelengths. Network capacity is based on the number of wavelengths, or channels, in each fiber and the bandwidth, or size of the channels. By using WDM add/drop equipment at network nodes, the entire composite signal can be fully demultiplexed into its constituent channels and switched (added/dropped or passed through). In such networks, traffic from one network node to another network node are often assigned to a particular wavelength on which the traffic is communicated over the network. By assigning different traffic streams to different wavelengths, interference between different traffic streams is prevented. However, in certain situations, this creates inefficiency in the network. For example, if the traffic assigned to a particular wavelength does not typically use much of the bandwidth (capacity) associated with the wavelength, then inefficiencies are created.

SUMMARY

A method and system for establishing transmission priority for optical light-trails are provided. According to one embodiment, an optical network is provided that carries optical traffic in multiplexed wavelengths between a plurality of nodes. The optical network includes a light-trail, a convener node, one or more intervening nodes, and an end node. The light-trail is established in the optical network between the convener node and the end node and couples the convener node, the intervening nodes, and the end node. Furthermore, the light-trail is associated with one of a plurality of wavelengths.

Each of the convener node, the one or more intervening nodes, and the end node is operable to receive optical traffic in a number of multiplexed wavelengths from the optical network, drop a first copy of the multiplexed optical traffic from the optical network, and forward a second copy of the multiplexed optical traffic on the optical network. These nodes also forward the optical traffic in selected wavelengths of the dropped first copy for communication to one or more client devices associated with the node. The nodes further convert traffic received from one or more client devices of the node into client optical traffic in one or more wavelengths, passively add the client optical traffic to the second copy or to a modification of the second copy to form a combined signal, and forward the combined signal to the network.

The convener node and the intervening nodes are each operable to determine whether another node having a higher priority is transmitting optical traffic on the light-trail and, in response to determining that no node having a higher priority is transmitting on the light-trail, transmit optical traffic to one of the nodes in the light-trail. The convener node and the intervening nodes are each further operable to indicate to one or more nodes on the light-trail that optical traffic is being transmitted on the light-trail.

Technical advantages of certain embodiments of the present invention may include efficient techniques for prioritizing use of shared transmission resources on optical networks. More specifically, in particular embodiments of the present invention, nodes of an optical network are capable of establishing an optical path, or "light-trail," including one or more other nodes for the transmission of optical traffic, such a light-trail may be shared by the nodes included in the light-trail. Particular embodiments of the present invention utilize certain techniques for granting use of the light-trail to a particular node included in a light-trail when more than one node desires to transmit on the light-trail at a given time. The optical network may grant use of the light-trail based on any appropriate criteria, allowing the optical network to prioritize use of the light-trail by certain nodes and/or prioritize the transmission of certain data. Thus, these techniques may result in more efficient communication of information in the optical network.

Other technical advantages provided by one or more embodiments may include decentralized control of shared light-trails, distributed decision-making regarding the assignment of priorities to nodes and/or transmissions, and the ability to modify the priority of nodes and/or transmissions during operation. As a result, particular embodiments may provide a flexible and robust system for communicating optical information.

It will be understood that the various embodiments of the present invention may include some, all, or none of the enumerated technical advantages. In addition other technical advantages of the present invention may be readily apparent to one skilled in the art from the figures, description, and claims included herein.

DETAILED DESCRIPTION OF THE DRAWINGS

Figure 1:
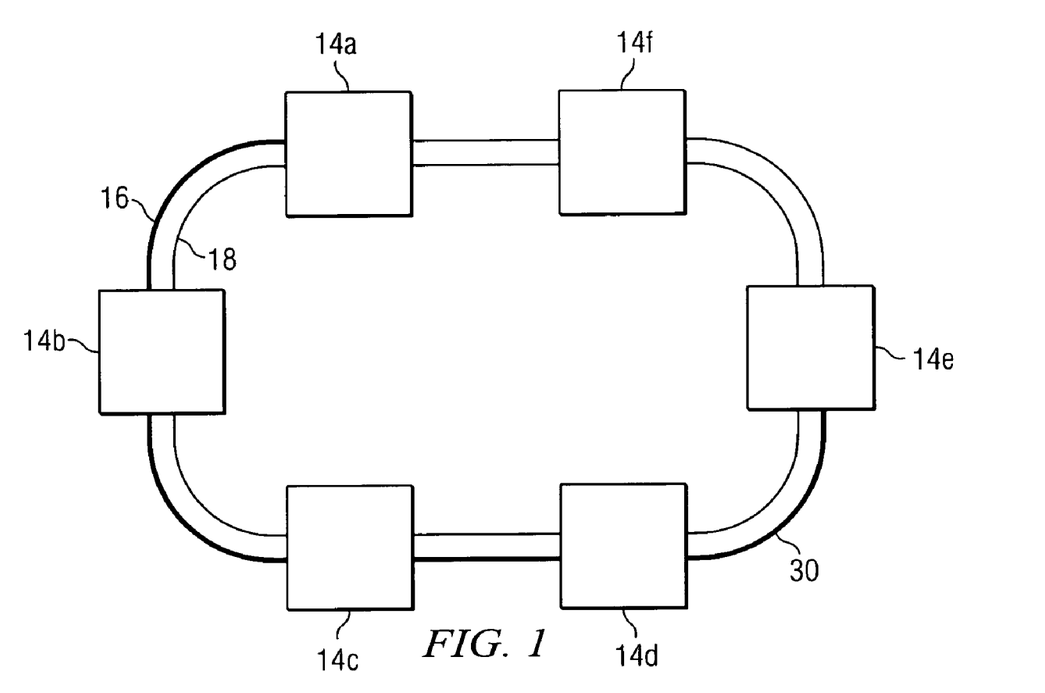
FIG. 1 is a block diagram illustrating an optical ring network in accordance with one embodiment of the present invention.

FIG. 1 illustrates an optical network 10 in accordance with one embodiment of the present invention. Optical network 10 includes a plurality of nodes 14 coupled to an optical ring 20. During operation, nodes 14 transmit and receive traffic on optical ring 20 on one of a plurality of wavelengths. In particular, a light-trail, such as light-trail 30 in FIG. 1, may be established over which nodes 14 may transmit optical traffic to other nodes 14 located on that light-trail. Nodes included in a light-trail share the light-trail, as appropriate, to transmit information to other nodes included in the light-trail on a wavelength associated with the light-trail. Thus, a light-trail is a generalization of a light path (an optical wavelength circuit) such that multiple nodes along the path can take part in communication along the path. Therefore, the use of these light-trails addresses the inefficiency discussed above associated with assigning a wavelength for traffic communicated from a single node to another node. In addition, light-trail communications allow optical multicasting and dynamic provisioning.

Figure 2:
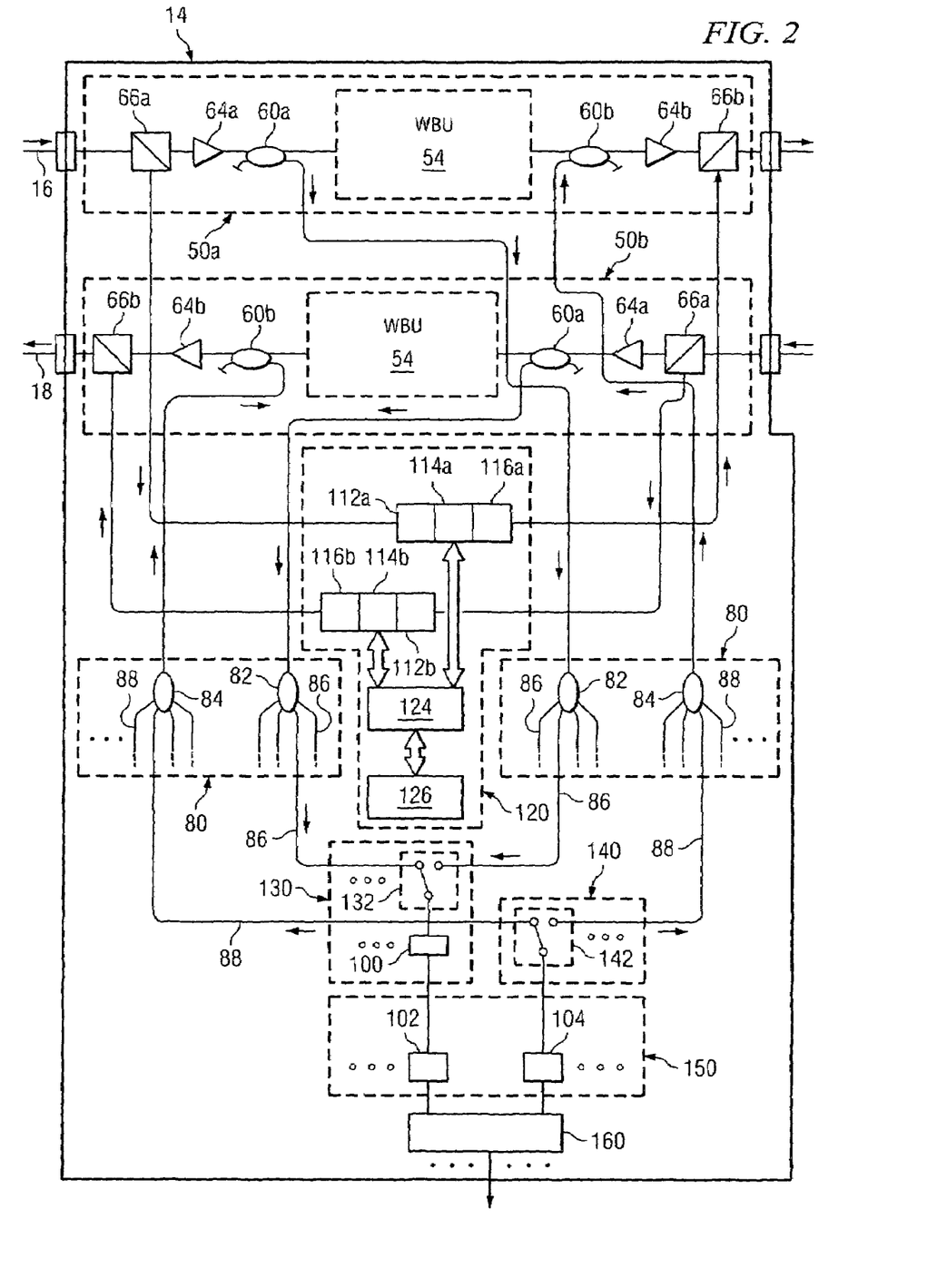
FIG. 2 is a block diagram illustrating a particular embodiment of a node that may be utilized in the optical network shown in FIG. 1.

Nodes 14 that allow light-trail communication have specific characteristics that enable the nodes 14 to implement light-trails. For example, these characteristics include a drop and continue function (where traffic received by an element of the node is both dropped and forwarded, so as to allow the traffic to continue along the light-trail), passive adding of traffic by the node ("passive" in this context means the adding of traffic without using optical switches that use power, electricity, and/or moving parts), and the use of an out-of-band control channel (as opposed to control signals that are in-band with the data being communicated on the network 10). As described below, FIG. 2 illustrates a particular embodiment of node 14 including these characteristics.

Referring again to FIG. 1, although a single light-trail 30 is illustrated, nodes 14 may establish light-trails on one or more wavelengths utilized by optical network 10 and multiple non-overlapping light-trails may exist at a particular time on a particular wavelength. To prevent optical interference caused by multiple nodes 14 transmitting simultaneously on a particular light-trail in optical network 10, nodes 14 may utilize techniques for granting use of a light-trail to a particular node 14 at a given time, as described below. Therefore, there are two levels of "arbitration" associated with light-trails. The first level is the establishment and termination of light-trails to meet particular demands, as well as the "dimensioning" of light-trails (growing or shrinking the trails to meet particular demands). The second level of arbitration is the allocation of the use of the light-trail to nodes in the light-trail. Nodes may be allocated bandwidth according to defined rules or heuristics, predefined bandwidth allocation algorithms, "round robin" techniques (as discussed below), on a dynamic basis, and/or using any other suitable techniques.

Although FIG. 1 illustrates a particular embodiment and configuration of ring network 10, mesh, linear, or other suitable types of optical networks may be used in accordance with the present invention. In the illustrated embodiment, network 10 is an optical network in which a number of optical channels are carried over a common transmission media at different wavelengths. For example, network 10 may be a wavelength division multiplexed (WDM) network, a dense wavelength division multiplexed (DWDM) network, or any other suitable multi-channel network. Network 10 may represent all or a portion of a short-haul metropolitan network, a long-haul intercity network, or any other suitable network or combination of networks. Network 10 may include, as appropriate, a single uni-directional fiber, a single bi-directional fiber, or a plurality of uni- or bi-directional fibers.

Optical ring 20, in the illustrated embodiment, comprises a pair of uni-directional fibers, first fiber 16 and second fiber 18, transporting traffic in a counterclockwise and clockwise direction, respectively. Optical ring 20 optically couples the plurality of nodes 14a-14f, and optical traffic propagates between nodes 14 over optical ring 20. As used herein, "traffic" means information transmitted, stored, or sorted in the network. Such traffic may comprise optical signals having at least one characteristic modulated to encode audio, video, textual, real-time, non-real-time and/or other suitable data. Modulation may be based on phase shift keying (PSK), intensity modulation (IM), and other suitable methodologies. Additionally, the information carried by this traffic may be structured in any suitable manner. Although the description below focuses on an embodiment of network 10 that communicates traffic on optical ring 20 in the form of optical frames, network 10 may be configured to communicate traffic structured in the form of frames, as packets, or in any other appropriate manner.

Using established light-trails, nodes 14 facilitate communication between a plurality of client devices (not shown) coupled to each node 14 through a plurality of client ports. As described in greater detail below, each node 14 may receive traffic from client devices coupled to that node 14 and add this traffic to optical ring 20 to the optical traffic propagating on optical ring 20. Each node 14 may also receive traffic from optical ring 20 and drop traffic destined for client devices of that node 14, such as personal computers (PCs), telephones, fax machines, hard drives, web servers, and/or any other appropriate communication device. Although FIG. 1, illustrates one embodiment of network 10 that includes a particular number of nodes 14, network 10 may include any appropriate number of nodes 14 configured in any appropriate manner.

In operation, nodes 14 generate optical traffic at one or more wavelengths based on electrical signals received by nodes 14 from client devices coupled to nodes 14 and add this optical traffic to optical traffic propagating on optical ring 20. Nodes 14 also receive and drop traffic propagating on optical ring 20 that is destined for one or more of its clients. For the purposes of this description, nodes 14 may "drop" traffic by transmitting a copy of the traffic to any appropriate components that are a part of or coupled to the relevant node 14. As a result, nodes 14 may drop traffic from optical ring 20 by transmitting the traffic to these components while allowing the traffic to continue to downstream components on optical ring 20. Each node 14 drops and electrically converts traffic received on particular wavelengths at which that node 14 is configured to receive traffic and either does not drop or discards traffic transmitted at other wavelengths. Once traffic is dropped from the optical ring 20, nodes 14 may provide optical-to-electrical conversion of the dropped traffic. Nodes 14 then extract, based on addressing information in the traffic, portions of this traffic destined for client devices coupled to that node 14. In certain embodiments, each node 14 comprises a switching element (not shown in FIG. 1) which may forward the traffic, or a portion thereof, to one or more of a plurality of client devices based on addressing information.

Since nodes 14 time-share a wavelength associated with a particular light-trail, the data flow patterns through a light-trail dominant network may be somewhat "bursty" in nature due to the interleaving of data streams from multiple nodes 14. However, client devices (typically, Layer-2 devices) associated with a node 14 expect that the optical layer will provide uninterrupted communication to the devices. therefore, to facilitate an interface between the bursty optical layer (due to time sharing of the bandwidth of light-trails) and the continuous client layer, nodes 14 include a device called a burstponder. A burstponder is a device that allows a node 14 to time share a wavelength while creating an impression to client device of the node 14 that the wavelength is available on a seamless and continuous basis. Such a burstponder is described in further detail in conjunction with FIGS. 2A-2B.

Figure 3A:
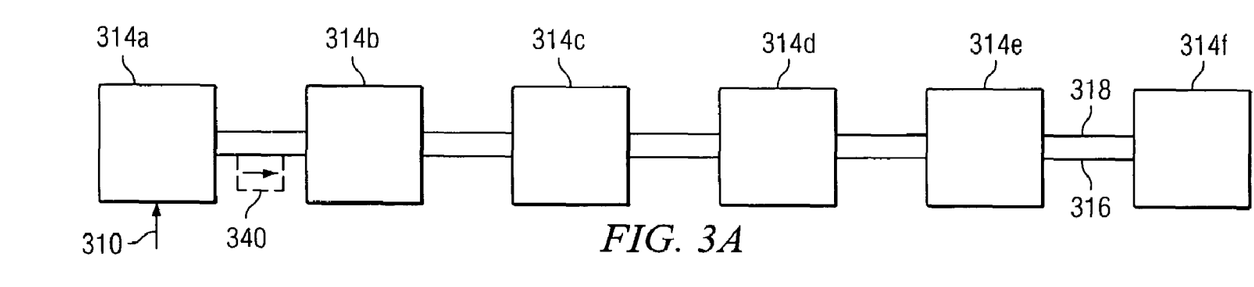
FIG. 3A-3C illustrate an example operation of a particular embodiment of the optical network in establishing a light-trail.
Figure 3B:
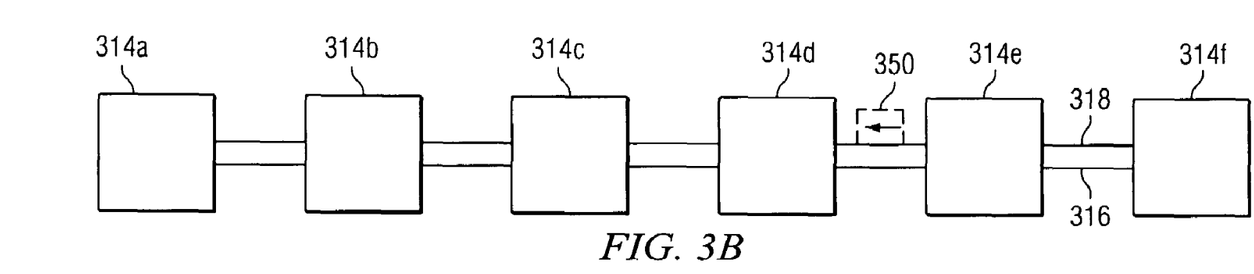
Figure 3C:
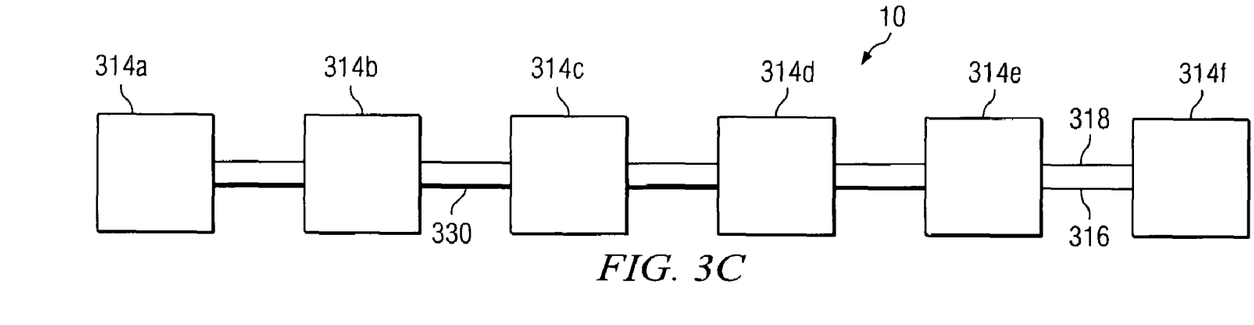

Additionally, nodes 14 may be configured to establish light-trail 30 and transmit or receive some or all optical traffic on light-trail 30. Light-trail 30 represents an optical path on a portion of fiber connecting any two or more components in optical network 10. Light-trail 30 is illustrated in FIG. 1 as a shaded portion of fiber 16. Once light-trail 30 is established, any of the nodes 14 connected to light-trail 30 may transmit optical traffic on light-trail 30 to nodes 14 located downstream from the transmitting node 14 in the direction traffic is propagating along light-trail 30. A particular node 14 may terminate or reconfigure light-trail 30 at any appropriate time. Additionally, as noted above, in particular embodiments, multiple light-trails may be established in optical ring 20, with each light-trail associated with a particular wavelength. Furthermore, multiple, non-overlapping light-trails may be associated with a common wavelength. The operation of a particular embodiment of optical network 10 in establishing a light-trail is illustrated in FIGS. 3A-3C.

As mentioned above, to coordinate the establishment and sharing of light-trails, optical network 10 supports an optical supervisory channel (OSC), or other out-of-band control channel, on which control signals are exchanged between nodes 14 and/or other components of optical network 10. Nodes 14 may exchange control messages on the OSC to initiate and terminate light-trails and to manage use of established light-trails. In a particular embodiment, the OSC represents one or more wavelengths, among a plurality of wavelengths utilized by optical network 10, that are dedicated to control signals. Alternatively, the OSC may represent a separate fiber in optical ring 20 on which nodes 14 may exchange control signals. According to particular embodiments, control signals associated with a particular light-trail may be transmitted on the OSC in the direction of traffic on that light-trail, in a direction opposite to the direction of traffic on that light-trail, or in both directions on the OSC.

Use of light-trails may result in more efficient transmission of traffic between nodes 14. In particular embodiments, nodes 14 may be configured to use light-trails to transmit all traffic and may establish additional light-trails if the amount of traffic flowing on a particular light-trail exceeds a particular threshold, or if a particular node 14 is unable to transmit traffic that cannot be delayed (e.g., due to use of light-trail by other nodes 14). In general, however, nodes 14 may be configured to establish light-trails based on any appropriate criteria, factors, or considerations.

In particular embodiments of optical network 10, a particular node 14 is granted use of an existing light-trail to transmit optical traffic to other nodes 14 based on a priority associated with that node 14. Thus, when more than one node 14 is attempting to transmit optical traffic on the same light-trail at the same time, an element of optical network 10 may determine which node 14 will be granted use of that light-trail based on a comparison of the priorities of the competing nodes 14. As a result, in particular embodiments of optical network 10, these techniques may result in more efficient communication of information as transmission by certain nodes 14 or the transmission of certain information may be given priority over other transmissions, allowing, for example, particular nodes 14 to satisfy minimum quality of service (QoS) requirements for their transmissions. Furthermore, because the priorities associated with particular nodes 14 or particular transmissions may be determined dynamically, optical network 10 may provide a robust and flexible system for optical communication.

FIG. 2 is a block diagram illustrating a particular embodiment of a node 14 that may be utilized in the example ring network 10 of FIG. 1 or may be used as a node in any other type of network to implement light-trails. As shown, node 14 includes a managing element 110, a burstponder 150, a switching element 160, transport elements 50a and 50b, a drop element 130, an add element 140, and distributing/combining elements 80a and 80b.

Transport elements 50 add traffic to and drop traffic from fibers 16 and 18. More specifically, transport elements 50 may generate one or more copies of traffic propagating on fibers 16 and 18 for use by node 14 or for communication to components coupled to node 14. Additionally, transport elements 50 may include components appropriate to add traffic generated by node 14 or received from client devices of node 14 to fibers 16 and 18. For example, in the illustrated embodiment, each transport element 50 includes a coupler 60a which splits traffic received by transport elements 50 into two copies and forwards one copy of the traffic to drop element 130, while forwarding the other coy along the relevant fiber. Furthermore, each transport element 50 includes a coupler 60b which adds traffic received from add element 140 to traffic already propagating on the associated fiber.

Each transport element 50 also includes, in the illustrated embodiment, a wavelength blocking unit (WBU) 54 configured to terminate particular wavelengths of traffic propagating on fibers 16 and 18. As a result, traffic that has already been received by its intended destination or destinations may be terminated at a subsequent node 14. Although shown as a functional block in FIG. 2, WBU 54 may represent and/or include suitable components configured in any appropriate manner to provide the functionality of dynamically blocking certain wavelengths and passing other wavelengths. As one example, WBU 54 may represent a wavelength-selective switch (WSS) operable to output any particular wavelength, or set of wavelengths, received at the input of WBU 54 on the output of WBU 54.

As another example, WBU 54 may represent a structure that includes an optical demultiplexer and an optical multiplexer connected by a series of switches. In such an embodiment, the demultiplexer may demultiplex the signal into its constituent channels. The switches may then be dynamically configured to selectively terminate or forward each channel to the multiplexer based on control signals received by each switch. The channels that are forwarded by the switches are received by the multiplexer, multiplexed into a WDM optical signal, and forwarded to downstream elements.

As another example, WBU 54 may represent a collection of tunable filters tuned to allow only traffic on appropriate wavelengths to be forwarded on fibers 16 or 18. In such an embodiment, a coupler of WBU 54 may receive optical signals input to WBU 54 and split the optical signals into a plurality of copies, transmitting each of these copies to a particular tunable filter. Each tunable filter may then selectively pass traffic propagating at a particular wavelength or within a particular range of wavelengths and block traffic propagating at all other wavelengths. Each tunable filter then forwards the passed traffic propagating at the associated wavelength or wavelengths to an output coupler of WBU 54. The output coupler then combines the output of the various tunable filters to produce an output WDM optical signal and forwards the output optical signal to components downstream from WBU 54.

Transport elements 50 may also include appropriate components to allow node 14 to transmit and receive information pertaining to the status and operation of fibers 16 and 18, other nodes 14, any light-trails established on optical ring 20, or any other appropriate elements of optical network 10. In particular, each node 14 may include elements to allow node 14 to receive and transmit messages on an optical supervisory channel (OSC). In the illustrated embodiment, each transport element 50 includes an OSC ingress filter 66a that processes an ingress optical signal from its respective fiber 16 or 18. Each OSC filter 66a filters the OSC signal from the optical signal and forwards the OSC signal to a respective OSC receiver 112. Each OSC filter 66a also forwards the remaining optical signal to other components of transport element 50. Each transport element 50 also includes an OSC egress filter 66b that adds an OSC signal from an associated OSC transmitter 116 to the optical signal propagating on the associated fiber 16 or 18 and forwards the combined signal to elements located downstream on fiber 16 or 18. The added OSC signal may be locally-generated data or may be OSC data received by node 14 and passed through managing element 110.

Distributing/combining elements 80 may each comprise a drop signal splitter 82 and an add signal combiner 84. Splitters 82 may each comprise a coupler connected to one optical fiber ingress lead and a plurality of optical fiber egress leads which serve as drop leads 86. Each drop lead 86 may be connected to a drop element 130 associated with a particular local port of node 14. Although the illustrated embodiment shows a splitter 82 coupled to one drop lead 86, splitter 82 may be coupled to any appropriate number of drop leads 86.

Splitter 82 may, in general, represent any appropriate component or collection of components capable of splitting the optical signal received by splitter 82 into a plurality of copies each to be propagated on a particular drop lead 86. In particular embodiments in which four drop leads 86 are implemented, splitters 82 may each specifically comprise a 2×4 optical coupler, where one ingress lead is terminated, the other ingress lead is coupled to a coupler 60 via a fiber segment, and the four egress leads are used as drop leads 86.

Combiners 84 similarly may each comprise a coupler with multiple optical fiber ingress leads, which serve as add leads 88, and one optical fiber egress lead. Each add lead 88 may be connected to an add element 140 associated with a particular port of node 14. In particular embodiments in which combiner 84 is coupled to four ingress leads, combiner 84 may comprise a 2×4 optical coupler, where one egress lead is terminated, the other egress lead is coupled to a coupler via a fiber segment, and the four ingress leads comprise add leads 88. As with splitter 82, the described components of combiner 84 may be replaced by any suitable component or collection of components for combining a plurality of optical signal into a single output signal. Although the illustrated embodiment shows a combiner 84 coupled to one add lead 88, combiner 84 may be coupled to any appropriate number of add leads 88.

Drop elements 130 selectively couple ports of burstponder 150 to outputs of distributing/combining elements 80 through filters 100, which are capable of isolating particular wavelengths of optical traffic. As a result, drop elements 130 may output particular wavelengths of traffic from fibers 16 and 18 to particular ports of burstponder 150. Add elements 140 also couple particular ports of burstponder 150 to combining/distributing elements 80. Drop element 130 and add element 140 may include, respectively, a drop switch 132 and an add switch 142, or other suitable components, to selectively connect associated ports of burstponder 150 to fiber 16 or 18. As a result, drop element 130 and add element 140 may be utilized to support protection switching for node 14. Alternatively, particular embodiments of drop element 130 and add element 140 may omit drop switch 132 and add switch 142, respectively, and couple a particular port of burstponder 150 to a particular one of fiber 16 and fiber 18. Moreover, in particular embodiments, node 14 may include multiple drop elements 130 and/or add elements 140, each associated with a particular wavelength supported by optical network 10.

Burstponder 150 converts bursty or time-interleaved optical traffic received from drop elements 130 to seamless or continuous electrical traffic for delivery to client devices of node 14 and converts electrical traffic received from client devices to optical traffic for transmission on fiber 16 or 18 in bursts when the node 14 has use of the light-trail. As described above, burstponder 150 allows node 14 to time-share a light-trail while creating an impression to client devices of the node 14 that the wavelength is available on a seamless and continuous basis. Burstponder 150 may include any appropriate number of receivers 102 operable to receive optical signals and generate electrical signals based on these optical signals and transmitters 104 operable to receive electrical signals and to transmit optical signals based on these electrical signals. Depending on the configuration of node 14, each of these receivers 102 and transmitters 104 may be fixed or tunable. Moreover, each of these receivers 102 and transmitters 104 may be a burst-mode receiver or transmitter that has burst-mode clock and data-recovery operation. As described below, switching element 160 may represent any appropriate component or components for transmitting electrical traffic output by burstponder 150 to appropriate client devices of node 14 and for transmitting electrical traffic received from client devices of node 14 to appropriate ports of burstponder 150 (such ports may each be associated with a particular transmitter 104). In a particular embodiment, switching element 160 comprises a Layer-2 (L2) switch. Although shown as part of node 14 in FIG. 2, switching element 160 may represent a physical separate component of optical network 10.

Managing element 110 may comprise OSC receivers 112, OSC interfaces 114, OSC transmitters 116, and an element management system (EMS) 124. Each OSC receiver 112, OSC interface 114, and OSC transmitter 116 set forms an OSC unit for one of the fibers 16 or 18 in the node 14. The OSC units receive and transmit OSC signals for the EMS 124. EMS 124 may be communicably coupled to a network management system (NMS) 126. NMS 126 may reside within node 14, in a different node, or external to all nodes 14.

EMS 124 and/or NMS 126 may comprise logic encoded in media for performing network and/or node monitoring, failure detection, protection switching and loop back or localized testing functionality of the optical network 10. In a particular embodiment, EMS 124 and/or NMS 126 generate, transmit, receive, and/or process control messages associated with the establishment, operation, and termination of light-trails. Any logic included in EMS 124 or NMS 126 may comprise software encoded in a disk or other computer-readable medium, such as memory, and/or instructions encoded in an application-specific integrated circuit (ASIC), field programmable gate array (FPGA), or other processor or hardware. It will be understood that functionality of EMS 124 and/or NMS 126 may be performed by other components of the network and/or be otherwise distributed or centralized. For example, operation of NMS 126 may be distributed to the EMS 124 of nodes 14, and the NMS 126 may thus be omitted as a separate, discrete element. Similarly, the OSC units may communicate directly with NMS 126 and EMS 124 omitted.

EMS 124 monitors and/or controls elements within node 14. For example, EMS 124 may control operation of transmitters 104, receivers 102, and WBU 54 to facilitate the establishment and use of light-trail. In the illustrated embodiment, EMS 124 receives an OSC signal from each of fiber 16 and 18 in an electrical format via an OSC receiver 112 associated with that fiber (the OSC receiver 112 obtains the signal via an OSC filter 66a). This OSC signal may include one or more of multiple types of control messages, as described above. EMS 124 may process the signal, forward the signal and/or loop-back the signal. EMS 124 may be operable to receive the electrical signal and resend the OSC signal via OSC transmitter 116 and OSC filter 66b to the next node on fiber 16 or 18, adding, if appropriate, locally-generated control messages or other suitable information to the OSC.

NMS 126 collects information from all nodes 14 in optical network 10 and is operable to process control messages transmitted by nodes 14 to manage particular aspects of the use of light-trails. For example, in a particular embodiment, NMS 126 may be operable to select a particular node 14 for transmission on a particular light-trail when multiple nodes 14 request use of that light-trail. As noted above, NMS 126 may represent a portion or all of EMSs 124 of all nodes 14 in optical network 10. Moreover, although the description below describes particular embodiments of optical network 10 in which functionality is divided between NMS 126 and EMSs 124 in a particular manner, in alternative embodiments the described functionality may be distributed between NMS 126 and EMSs 124 in any appropriate manner. Additionally, although NMS 126 and EMS 124, as shown in FIG. 2, represent, at least in part, components located within node 14, some or all of NMS 126 and/or EMS 124 may be located external to nodes 14.

Although not shown in FIG. 2, node 14 may also include a memory operable to store code associated with EMS 124, NMS 126, and/or other components of optical network 10, information specifying a wavelength assignment scheme utilized for protection traffic on optical network 10, and/or any other suitable information used during operation of optical network 10. Memory may represent one or more memory devices that are located within node 14 or that are physically separate from node 14. Additionally, memory may be shared with other components of optical network 10 including other nodes 14. Memory may represent computer disks, a hard disk memory, random access memory (RAM), read-only memory (ROM), or any other suitable storage media.

In operation, transport elements 50 receive traffic from fibers 16 and 18. In the illustrated embodiment, traffic received from fibers 16 and 18 includes an OSC signal, and transport elements 50 are operable to add and drop the OSC signal to and from fibers 16 and 18. More specifically, each OSC ingress filter 66a processes an ingress optical signal from its respective fiber 16 or 18. OSC ingress filter 66a filters the OSC signal from the optical signal and forwards the OSC signal to its respective OSC receiver 112. Each OSC ingress filter 66a also forwards the remaining transport optical signal to the associated amplifier 64. Amplifier 64 amplifies the signal and forwards the signal to its associated coupler 60a.

EMS 124 may process control messages transmitted by other nodes 14 or other components of optical network 10 and adjust operation of node 14 in response. In particular, EMS 124 may reconfigure WBU 54, transmitters 104, filters 100, receivers 102, and/or any other appropriate element of node 14 in response to control messages received by EMS 124. As one example, EMS 124 may, in response to receiving a setup message, configure a WBU 54 of node 14 to allow traffic propagating at a particular wavelength to pass through WBU 54. As another example, EMS 124 may, in response to receiving an intimation message from another node 14, tune a particular filter 100 and/or a particular receiver 102 to allow node 14 to receive optical traffic on a particular wavelength associated with a particular light-trail.

Furthermore, EMS 124 may also generate control messages for transmission to other nodes 14 or other components of optical network 10. For example, EMS 124 may generate electronic signals associated with setup messages, intimation messages, request messages, and/or any other appropriate type of control messages and communicate these electronic signals to OSC transmitter 116 to transmit optical signals representing the appropriate control message to the associated transport element 50. These control messages may then be added to the optical traffic on fiber 16 or 18, as appropriate.

Meanwhile, coupler 60a splits the signal from the amplifier 64 into two copies: a through signal that is forwarded to WBU 54 and a drop signal that is forwarded to distributing/combining element 80. Distributing/combining element 80 may then split the drop signal into one or more copies and forward the copies of the drop signal to one or more drop elements 130. In a particular embodiment, each drop element 130 includes a drop switch 132 that allows drop element 130 to selectively couple a drop signal from either fiber 16 or fiber 18 to a filter 100 included in that drop element 130. Additionally, filter 100 may be tuned to a particular wavelength. As a result, in such an embodiment, traffic propagating at a particular wavelength on the selected fiber is output to burstponder 150.

Burstponder 150 receives the output of a plurality of drop elements 130. A receiver 102 in burstponder 150 that is associated with each drop element 130 converts the optical signal received from that drop element 130 into electrical traffic. The electrical traffic generated by each receiver 102 is then output to switching element 160. In particular embodiments of node 14, burstponder 150 may include buffers (not shown) and the output of receivers 102 may be stored in one or more buffer to be transmitted to switching element 160 at an appropriate time.

Switching element 160 receives seamless and continuous electrical traffic output by burstponder 150 and switches this electrical traffic in any appropriate manner to facilitate transmission of this electrical traffic to an appropriate client device of node 14. The electrical traffic received by switching element 160 from burstponder 150 may include information in the form of packets, frames, and/or datagrams, and/or information structured in any other appropriate form. For example, in a particular embodiment, switching element 160 may represent an L2 switch and may receive electrical signals from burstponder 150 in the form of packets.

Switching element 160 also receives electrical traffic from client devices coupled to switching element 160 and switches this electrical traffic to communicate the electrical traffic to an appropriate port of burstponder 150. The electrical traffic received by switching element 160 from the client devices may include information in the form of packets, frames, and/or datagrams, and/or information structured in any other appropriate form. As noted above, switching element 160 may represent an L2 switch and may receive electrical traffic from the client devices in the form of packets. In such an embodiment, the L2 switch may switch each packet, based on a header included in that packet, to deliver the packet to a port of the L2 switch coupled to an appropriate port of burstponder 150.

Burstponder 150 receives electrical traffic from switching element 160 on one or more ports of burstponder 150. Certain ports of burstponder 150 are configured to receive electrical traffic from switching element 160, and each of these ports may pass the received electrical traffic to a particular transmitter 104 in burstponder 150 associated with that port. Each transmitter 104 may then generate a burst of optical traffic from the electrical traffic received from switching element 160 and transmit that optical traffic to a particular add element 140 associated with that transmitter 104. In particular embodiments, EMS 124 may tune transmitters 104 of burstponder 150, and transmitters 104 may generate optical traffic at a particular wavelength determined by EMS 124. In other embodiments, transmitters 104 transmit at a fixed wavelength. Additionally, in a particular embodiment, burstponder 150 may include buffers, and electrical traffic from switching element 160 may be stored in one or more buffer to be input to transmitter 104 at an appropriate time, such buffering is useful since a node 14 may not be able to transmit traffic when it is received because another node 14 is using a shared light-trail.

Optical traffic output by transmitters 104 of burstponder 150 is then received by an appropriate add element 140 associated with the transmitter 104 that generated the optical traffic. Each add element 140 may include an add switch 142 capable of selectively coupling that add element to a combiner 84 in a distributing/combining element 80 associated with either fiber 16 or 18. As a result, optical traffic generated by transmitters 104 of burstponder 150 may be added to an appropriate fiber 16 or 18 based on the circumstances. For example, particular embodiments of node 14 may support protection switching and add switch 142 may be reconfigured in response to the detection of a fault on one fiber to transmit optical traffic on the other fiber. The appropriate distributing/combining element 80 then forwards the optical traffic received from burstponder 150 to the coupler 60b of the associated fiber.

Returning to the operation of couplers 60a, in addition to forwarding the drop signal as described above, each coupler 60a forwards the through signal to its respective WBU 54. WBUs 54 receive the optical signal and selectively terminate or forward channels of the through signal. In a particular embodiment of node 14, EMS 124 may control operation of WBU 54 to establish a light-trail on a specified wavelength on a particular fiber 16 or 18 in response to a setup message received from a convener node 14a. In particular, if node 14 represents a node 14 on the interior of the requested light-trail, EMS 124 may configure WBU 54 to allow optical signals propagating at the specified wavelength on the relevant fiber to pass through WBU 54. If node 14 represents a node 14e at the beginning or end of the light-trail, EMS 124 may configure WBU 54 to block optical signals propagating at the specified wavelength on the relevant fiber.

Each coupler 60b may subsequently combine the output of a particular WBU 54 with the traffic received from an associated combiner 84. After coupler 60b adds locally-derived traffic to the output of WBU 54, coupler 60b forwards the combined signal to the associated OSC egress filter 66b. Each OSC egress filter 66b adds an OSC signal from the associated OSC transmitter 116 to the combined optical signal and forwards the new combined signal as an egress transport signal to the associated fiber 16 or 18 of optical network 10.

FIGS. 3A-3C illustrate operation of a particular embodiment of an optical network in establishing a light-trail 330 (shown in FIG. 3C). In particular, FIGS. 3A-3C illustrate an example operation of a particular embodiment of an optical network as a particular node 314 attempts to establish a light-trail 330 in response to receiving electrical traffic from a client device of that node 314. Nodes 314 and fibers 316 and 318 shown in FIGS. 3A-3C may represent a complete optical network or may represent a portion of a larger optical network, such as optical network 10 shown in FIG. 1. Furthermore, although shown as being coupled in a linear manner nodes 314 may be coupled in a ring, a mesh, or in any other suitable fashion. For example, nodes 314a-f may represent nodes 14a-f of network 10 of FIG. 1.

FIG. 3A illustrates an example operation of an optical network as node 314a (referred to below as "convener node 314a") receives electrical traffic 310 from a client device coupled to convener node 314a. To transmit optical traffic based on the electrical traffic, convener node 314a decides to establish light-trail 330 between convener node 314a and node 314e (referred to below as "end node 314e") along fiber 16. As indicated above, convener node 314a may decide to establish light-trail 330 in response to determining that the amount of optical traffic flowing on other light-trails that couple convener node 314a and end node 314e exceeds a predetermined threshold. Alternatively, any other node or device may initiate the establishment of light-trail 330.

Convener node 314a may establish light-trail 330 by sending one or more control messages to end node 314e and/or other nodes 314 on the OSC. As used herein, a "message" may represent one or more signal pulses, packets, or frames, or information structured in any other suitable format. For example, in a particular embodiment, convener node 314a transmits a setup message 340 to end node 314e and to all nodes 314, referred to here as "intervening nodes 314b-d," between this particular convener node 314a and end node 314e in the direction of traffic. Depending on the configuration of the optical network, convener node 314a may transmit setup message 340 on the OSC in the same direction as optical traffic is flowing on fiber 316, in the opposite direction (e.g. on fiber 318), or in both directions (e.g. on both fibers 16 and 18). In the illustrated example, the OSC is assumed to represent a wavelength transmitted on fiber 316, and convener node 314a transmits setup message 340 on fiber 316 in the direction traffic is propagating on fiber 316.

Setup message 340 may identify convener node 314a and end node 314e, specify the direction and wavelength to be used for transmissions on light-trail 330, and/or include any other appropriate information to be used by intervening nodes 314b-d and end node 314e to establish light-trail 330. Intervening nodes 314b-d may store setup message 340 until receiving an appropriate indication from end node 314e, such as an acknowledgement message, that end node 314e is prepared to establish light-trail 330.

FIG. 3B illustrates example operation of optical network 10 after end node 314e receives setup message 340. End node 314e, in response to receiving setup message 340, may reconfigure a wavelength-blocking unit 50 of end node 314e to prevent traffic propagating at the wavelength associated with the requested light-trail 330 from continuing past end node 314e on fiber 316. End node 314e transmits an acknowledgement message 350 to convener node 314a and/or intervening nodes 314b-d once end node 314e has configured the wavelength-blocking unit or at any other appropriate time after receiving setup message 340. Acknowledgement message 350 indicates to nodes 314 receiving the acknowledgment message that end node 314e is ready to establish light-trail 330. Convener node 314a and/or intervening nodes 314b-d may configure themselves in any appropriate manner to facilitate establishment of the light-trail, in response to receiving the acknowledgement message 350 or another appropriate form of indication from end node 314e. For example, intervening nodes 314*b-d* may each reconfigure a wavelength-blocking unit 50 of each node 314 to allow the wavelength associated with light-trail 330 to pass through that particular node 314. Additionally, convener node 314*a* may configure a wavelength-blocking unit of convener node 314*a* to block traffic propagating on fiber 316 at the wavelength, as described above with respect to FIG. 2. By blocking traffic propagating on fiber 316 at the wavelength associated with light-trail 330, convener node 314*a* may allow other light-trails that do not overlap with light-trail 330 to utilize the same wavelength as light-trail 330 without interfering with traffic transmitted on light-trail 330.

Additionally, each node 314 may maintain a light-trail table or matrix that maintains information regarding light-trails established on optical network 10 or light-trails to which that node 314 is coupled. These light-trail tables may include any appropriate information for the relevant light-trails. For example, light-trail tables may include information specifying the convener node and end node of each light-trail, the wavelength associated with each light-trail, whether each light-trail is currently being used, and/or any other suitable information about each light-trail.

FIG. 3C illustrates a state of optical network 10 after node 314*a* receives acknowledgement message 350 and performs any appropriate reconfiguration. As a result of the reconfiguration of convener node 314*a*, intervening nodes 314*b-d* and end node 314*e*, light-trail 330 is formed which couples convener node 314*a* to each intervening node 314*b-d* and to end node 314*e*. Once light-trail 330 is established, convener node 314*a* and/or intervening nodes 314*b-d* may utilize light-trail 330 for transmissions to downstream intervening nodes 314*b-d* or to end node 314*e*. The operation of nodes 314 in transmitting optical traffic on an established light-trail 330 is described below with respect to FIGS. 4A-4C. Additionally, FIG. 5 illustrates operation of optical network 10 in granting use of a light-trail in situations where a particular node 314 requests use of the light-trail while another node 314 is already transmitting traffic on that light-trail.

Figure 4A:
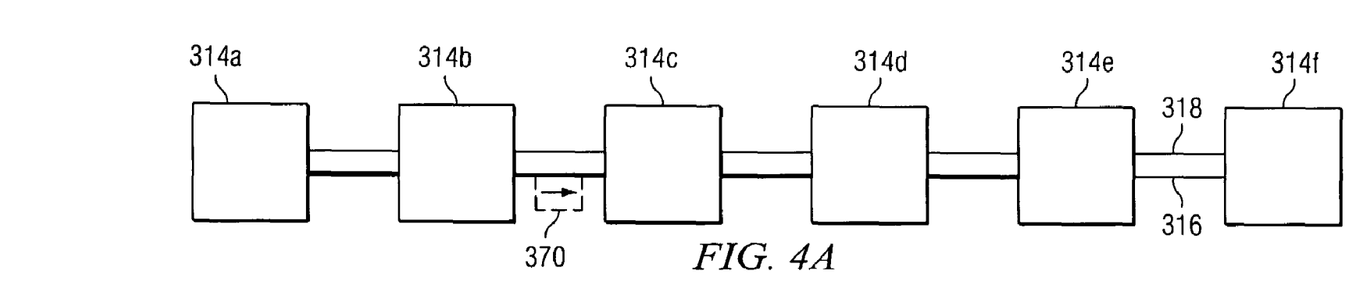
FIGS. 4A-4C illustrate an example operation of a particular embodiment of the optical network as a node transmits optical traffic on a light-trail established in the optical network.
Figure 4B:
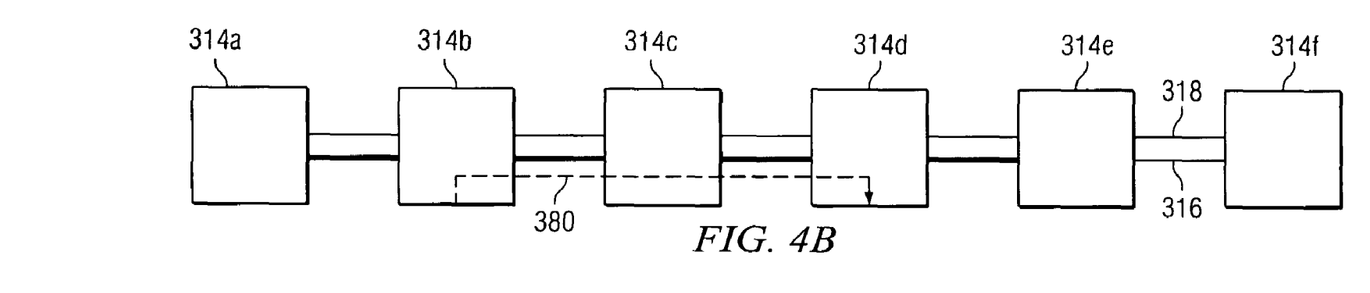
Figure 4C:
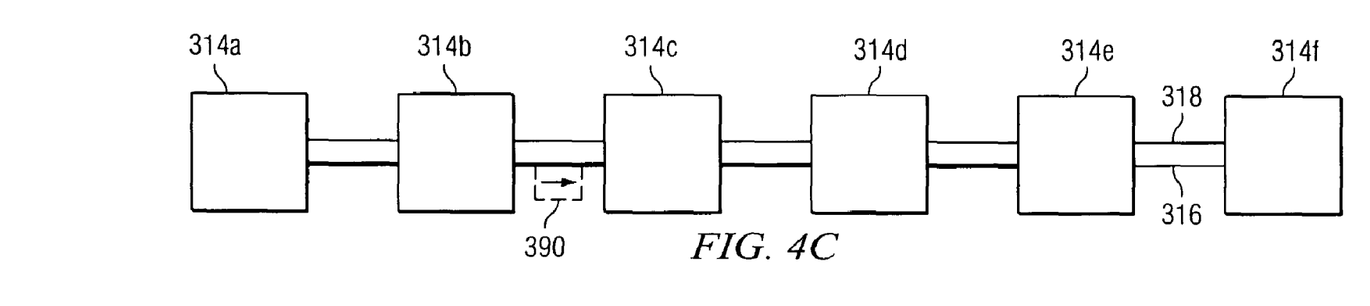
Figure 5:
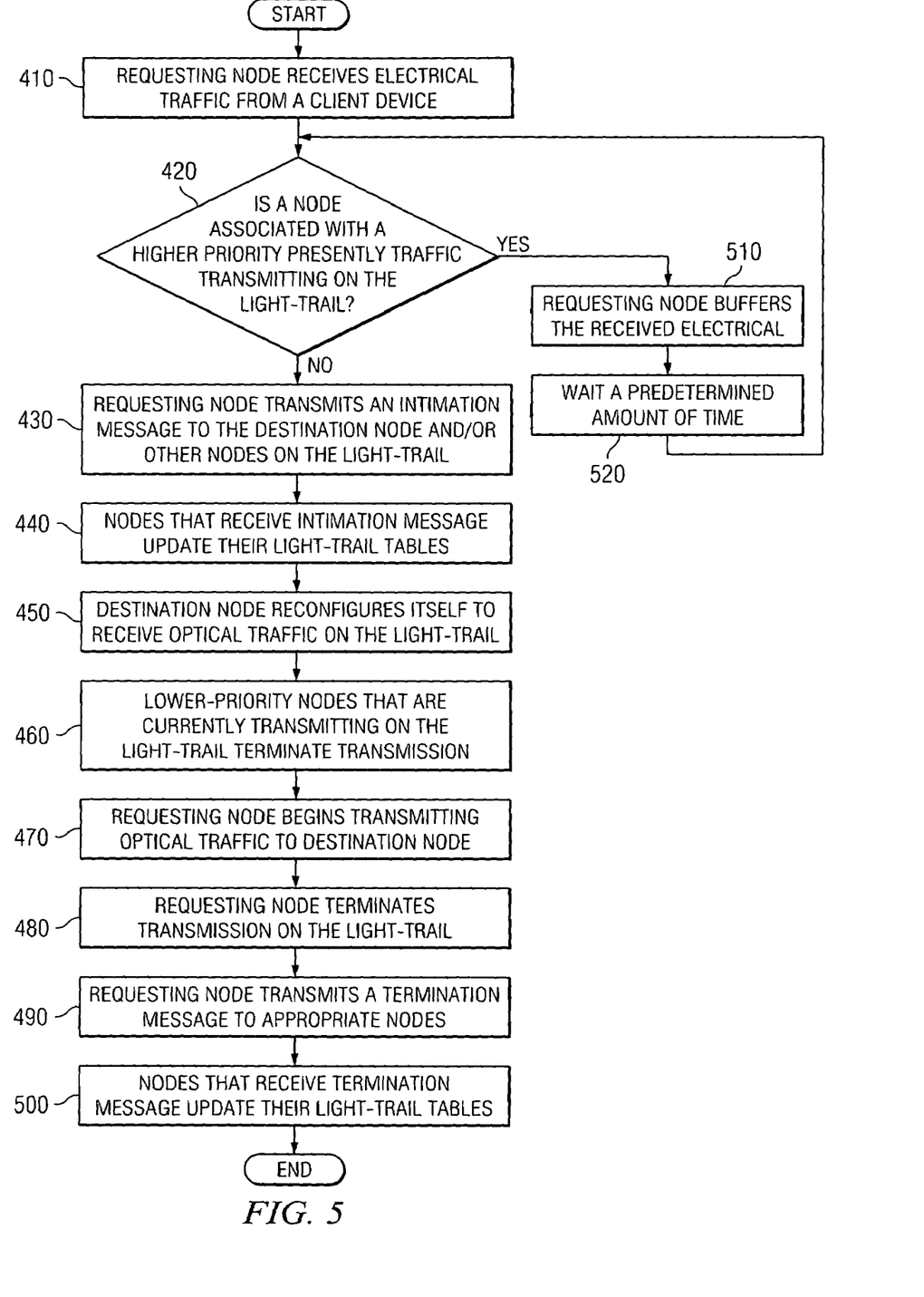
FIG. 5 is a flowchart illustrating an example operation of a particular embodiment of the optical network in granting use of a light-trail to one of two nodes simultaneously desiring to transmit on the light-trail.

FIGS. 4A-4C illustrate operation of a particular embodiment of the optical network of FIGS. 3A-3C in transmitting optical traffic along a light-trail 330 established between convener node 314*a* and end node 314*d* on fiber 316. In the example illustrated by FIGS. 4A-4C, light-trail 330, coupling convener node 314*a*, intervening nodes 314*b-d*, and end node 314*e*, is already established as described above. In particular, FIGS. 4A-4C illustrate operation of optical network 10 once a particular node 314, here node 314*b*, determines that it may transmit on light-trail 330. For the purposes of this description, a node 314 originating traffic in a light-trail will be referred to as a "source node." In a particular embodiment, source node 314*b* determines that source node 314*b* has optical traffic to transmit on fiber 316 in response to receiving the electrical traffic from a client device. If no other node is transmitting on light-trail 330, or if a node 314 with a lower priority than source node 314*b* is transmitting on light-trail 330, source node 314*b* may generate optical traffic based on the received electrical traffic. If a node with a higher priority than source node 314*b* is transmitting on light-trail 330, however, source node 314*b* may buffer the electrical traffic for later use, discard the electrical traffic, or take any other appropriate steps in lieu of transmitting optical traffic on light-trail 330. The process by which nodes 314 determine whether they can transmit on light-trail 330 is described in greater detail below with respect to FIG. 5. Again, FIGS. 4A-4C illustrate the operation of the optical network once node 314*b* has determined that it can transmit traffic over light-trail 330.

FIG. 4A illustrates operation of optical network 10 after source node 314b determines that source node 314*b* can use light-trail 330. To begin use of light-trail 330, source node 314*b* transmits an intimation message 370 to some or all of the other nodes 314 in light-trail 330 in the OSC. Intimation message 370 indicates to nodes 314 that receive intimation message 370 that source node 314*b* is or will be transmitting to destination node 314*d* on light-trail 330. As a result, intimation message 370 may identify the source node (in this example node 314*b*), the destination node 314 (in this example node 314*d*), and/or the light-trail (in this example light-trail 330), and/or may include any other appropriate information to indicate to other nodes 314 that destination node 314*d* will be transmitting on light-trail 330.

In a particular embodiment, source node 314*b* may transmit intimation message 370 to all nodes on light-trail 330. In alternative embodiments, source node 314*b* may transmit intimation message 370 to only a subset of nodes 314 on light-trail 330. For example, source node 314*b* may transmit an intimation message 370 with a header identifying particular nodes 314 on light-trail 330 as destinations for intimation message 370 or may communicate intimation message 370 in particular slots of the OSC associated with those particular nodes. Depending on the configuration of optical network 10, source node 314*b* may transmit intimation message 370 on the OSC in the same direction as optical traffic is flowing on fiber 16, in the opposite direction, or in both directions. In the illustrated example, the OSC is assumed to represent a wavelength transmitted on fiber 16, and source node 314*b* transmits intimation message 370 on fiber 16 in the direction traffic is propagating on fiber 16.

Each node 314 that receives intimation message 370 may update its light-trail table to reflect the fact that source node 314*b* is transmitting on light-trail 330. Furthermore, because node 314*b* determines that no higher-priority node 314 is transmitting before transmitting intimation message 370, any node 314 that may currently be transmitting on light-trail 330 presumably has a lower priority than node 314*b*. As a result, in particular embodiments of the optical network, nodes 314 may be configured such that any node 314 transmitting on light-trail 330 terminates its transmission in response to receiving intimation message 370.

Additionally, in response to receiving intimation message 370, the destination node 314*d* for the traffic to be transmitted by source node 314*b*, in this case destination node 314*d*, may also reconfigure itself to receive optical traffic on light-trail 330. For example, destination node 314*d* may tune a receiver 102 and/or filter 100 of destination node 314*d* to allow destination node 314*d* to receive traffic at a wavelength associated with light-trail 330.

FIG. 4B illustrates example operation of optical network 10 after node 314*b* transmits intimation message 370. Once appropriate nodes 314 have received intimation message 370, source node 314*b* may begin transmitting optical traffic 380 to destination node 314*d*. In particular, source node 314*b* may select or tune a transmitter 104 of source node 314*b* to transmit at the wavelength associated with light-trail 330 and may begin transmitting optical traffic 380 that is generated based on electrical traffic being received from one or more clients of source node 314*b*.

FIG. 4C illustrates operation of optical network 10 after source node 314*b* completes transmission on light-trail 330. Assuming node 314*b* is not preempted during transmission by a higher-priority node 314 desiring to transmit on light-trail 330, source node 314*b* finishes transmitting optical traffic to destination node 314*d*. Source node 314*b* may then transmit a termination message 390. Termination message 390 indicates that source node 314b is done transmitting optical traffic on light-trail 330 and may identify source node 314b, destination node 314d, and/or light-trail 330, and/or may include any other appropriate information to indicate to other nodes 314 that source node 314b is done transmitting on light-trail 330. In particular embodiments, source node 314b may transmit termination message 390 to all nodes 314 that are included in light-trail 330. In alternative embodiments, source node 314b may transmit termination message 390 to only particular nodes 314 coupled to light-trail 330. When nodes 314 receive termination message 390, nodes 314 may update their light-trail tables to indicate that light-trail 330 is now available for use.

FIG. 5 is a flowchart illustrating an example method for granting use of light-trail 330 of FIGS. 3A-3C and 4A-4C to a particular node when one node 314, referred to here as a requesting node, requests use of light-trail 330 to transmit optical traffic. In particular, FIG. 5 describes operation of an embodiment of optical network 10 in which use of light-trail 330 is granted to competing nodes 314 based on a priority associated with each of the relevant nodes 314. As described below, the priority of nodes 314 on light-trail 330 may be determined in any appropriate manner based on any suitable characteristics, factor, or consideration including, but not limited to, the transmission needs (e.g., minimum QoS requirements) of particular nodes 314 or of particular traffic. Additionally, although FIG. 5 illustrates a particular embodiment of optical network 10 that utilizes particular techniques for managing light-trail 330, including the exchange of specific messages between nodes 314, alternative embodiments of optical network 10 may manage light-trail 330 using any appropriate techniques.

In this example, requesting node 314 receives electrical traffic from a client device at step 410. At step 420, requesting node 314 determines whether another node 314 having a higher priority than requesting node 314 is presently transmitting on light-trail 330. For the purposes of this description and the claims that follow, a node is described as being "associated with" a priority regardless of whether the priority is actually associated with the node 314 itself or the traffic that node 314 is currently attempting to transmit.

Requesting node 314 may determine whether a higher-priority node 314 is transmitting on light-trail 330 in any appropriate manner based on the configuration and characteristics of optical network 10. In the illustrated embodiment, each node 314 coupled to light-trail 330 maintains a light-trail table in memory that includes an entry for each light-trail 330 to which that node 314 is currently coupled. The entry for each light-trail 330 will indicate whether that light-trail 330 is currently being used by a node 314 with a higher priority than the node 314 associated with that particular light-trail table. Nodes 314 may update their light-trail table based on control messages received on the OSC (such as intimation messages and termination messages) so that the light-trail tables accurately reflect the current state of light-trails 330 established on optical network 10. In such an embodiment, requesting node 314 may determine, based on an entry in its light-trail table associated with light-trail 330, whether a higher-priority node is currently transmitting on or requesting use of light-trail 330.

If no higher-priority node 314 is transmitting optical traffic on optical network 10, requesting node 314 may request use of light-trail 330 by transmitting an intimation message 370 on the OSC to a destination node 314 and/or other nodes 314 on light-trail 330 at step 430. Intimation message 370 indicates to nodes 314 that receive intimation message 370 that requesting node 314 is or will be transmitting to a destination node 314 on light-trail 330. As a result, intimation message 370 may identify requesting node 314, the destination node 314, and/or the light-trail, and/or may include any other appropriate information to indicate to other nodes 314 that requesting node 314 will be transmitting on light-trail 330.

As noted above, requesting node 314, in particular embodiments, may transmit intimation message 370 to all nodes 314 on light-trail 330. In alternative embodiments, requesting node 314 may transmit intimation message 370 to only those nodes 314 on light-trail 330 that have a priority that is equal to or less than the priority associated with requesting node 314. Requesting node 314 may transmit intimation message 370 in the direction of traffic on light-trail 339, in a direction opposite to the direction of traffic on light-trail 330, or in both directions on the OSC. For example, the optical network may have a linear topography or other characteristics that require requesting node 314 to transmit intimation message 370 in both directions for all nodes 314 on light-trail 330 to receive intimation message 370. As another example, requesting node 314b may be configured to transmit control messages to all nodes 314 using the shortest route to these nodes 314 and, based on the location of a particular node 314, may transmit intimation message 370 to a that node in the same direction as or in the opposite direction to the direction of traffic on light-trail 330.

At step 440, nodes 314 that receive intimation message 370 may update their light-trail tables to reflect the fact that requesting node 314 is transmitting on light-trail 330. In updating their light-trail tables, appropriate nodes 314 may also indicate the priority of requesting node 314 in their light-trail tables. Additionally, in response to receiving intimation message 370, destination node 314 may also reconfigure itself to receive optical traffic on light-trail 330 at step 450. For example, destination node 314 may tune a receiver 102 and/or filter 100 of destination node 314 to allow destination node 314 to receive traffic at the wavelength on which light-trail 330 has been established.

Furthermore, any lower-priority nodes 314 that are currently transmitting on light-trail 330 may terminate transmission in response to receiving intimation message 370 at step 460. If requesting node 314 transmits intimation message 370 to all nodes on light-trail 330, any node 314 that is currently transmitting may compare its priority to that of requesting node 314 and determine that requesting node 314 has a higher priority than that node 314. That node 314 may then terminate transmission based on this determination. Alternatively, if requesting node 314 transmits intimation message 370 to only those nodes 314 that have a lower priority than requesting node 314, any currently transmitting nodes 314 that receive intimation message 370 may terminate transmission based on their receipt of intimation message 370

Once appropriate nodes 314 have received intimation message 370 and/or terminated transmission on light-trail 330, requesting node 314 (which now becomes a source node) may begin transmitting optical traffic to destination node 314 at step 470. In particular, requesting node 314 may tune or select a transmitter 104 of source node 314 to transmit at the wavelength associated with light-trail 330 and may begin transmitting optical traffic that is generated based on the electrical traffic being received by source node 314. After source node 314 has completed transmitting optical traffic to destination node 314, source node 314 may terminate transmission at step 480.

After terminating transmission, requesting node 314 may transmit a termination message 390 to appropriate nodes 314 at step 490. Termination message 390 indicates that requesting node 314 is done transmitting optical traffic on light-trail 330 and may identify source node 314, destination node 314, and/or light-trail 330, and/or may include any other appropriate information to indicate to other nodes 314 that requesting node 314 is done transmitting on light-trail 330. In a particular embodiment, requesting node 314 may transmit termination message 390 to all nodes 314 coupled to light-trail 330. In alternative embodiments, requesting node 314 may transmit termination message 390 to only those nodes 314 coupled to light-trail 330 that have a priority equal to or less than the priority of requesting node 314. After nodes 314 receive termination message 390, nodes 314 may, at step 500, update their light-trail tables to indicate that light-trail 330 is now available for use.

If requesting node 314 instead determines at step 420 that a higher-priority node 314 is currently transmitting on light-trail 330, requesting node 314 determines that requesting node 314 can not use light-trail 330 at this time. As a result, requesting node 314 may wait until the higher priority node 314 completes transmission, abort its own transmission, or take any other appropriate actions at step 510. For example, in the embodiment described by FIG. 5, requesting node 314 buffers the received electrical traffic in a buffer of requesting node 314 at step 510. Requesting node 314 then waits a predetermined amount of time before attempting again to transmit on light-trail 330 at step 520. In such an embodiment, the priority of the transmission associated with requesting node 314 may be based, in part, on how long requesting node 314 has been waiting to transmit this traffic on light-trail 330, and thus, the priority may change as requesting node 314 waits. After waiting a predetermined amount of time, requesting node 314 again determines whether a higher-priority node 314 is transmitting on light-trail 330, returning to step 420.

Thus, particular embodiments of optical network 10 may provide efficiency benefits for the transmission of optical traffic. By providing techniques for prioritizing transmissions, optical network 10 may allow for more effective use of light-trails by nodes 314. Certain nodes 314 or certain transmissions by nodes 314 may be given priority for transmission on light-trail 330, allowing optical network 10 to ensure that particular information is transmitted with less delay and/or greater reliability.

Although the present invention has been described with several embodiments, various changes and modifications may be suggested to one skilled in the art. It is intended that the present invention encompass such changes and modifications as fall within the scope of the appended claims.

What is claimed:

1. An optical network operable to carry optical traffic in a plurality of wavelengths between a plurality of nodes, the optical network comprising:
    a light-trail established in the optical network between a convener node and an end node, wherein the light-trail couples the convener node, one or more intervening nodes, and the end node, and wherein the light-trail is associated with one of the plurality of wavelengths;
    the convener node operable to establish the optical light-trail by transmitting, in a control channel associated with a different wavelength than the wavelength associated with the light-trail, a setup message to the intervening nodes and the end node;
    each of the one or more intervening nodes operable to configure a wavelength-blocking unit of that intervening node, in response to receiving the setup message, to allow optical traffic propagating at the wavelength associated with the light-trail to pass through that intervening node; and
    the convener node and the intervening nodes each further operable to:
        determine whether another node having a higher priority is transmitting optical traffic on the light-trail;
        in response to determining that no node having a higher priority is transmitting optical traffic on the light-trail, transmit optical traffic to one of the nodes in the light-trail; and
        indicate to one or more nodes on the light-trail that optical traffic is being transmitted on the light-trail.

2. The optical network of claim 1, wherein the convener node and the intervening nodes are each further operable to indicate to one or more other nodes that optical traffic is being transmitted on the light-trail by transmitting an intimation message to the one or more other nodes in a control channel associated with a different wavelength than the wavelength associated with the light-trail.

3. The optical network of claim 2, the intimation message is transmitted to all nodes in the light-trail.

4. The optical network of claim 2, wherein the intimation message is transmitted to nodes in the light-trail that have a lower priority than the node transmitting the intimation message.

5. The optical network of claim 1, wherein each of the convener node and the one or more intervening nodes is operable to determine whether another node having a higher priority is transmitting based on a previously-received intimation message from the node having the higher priority.

6. The optical network of claim 1, wherein the convener node is further operable to configure a wavelength-blocking unit of the convener node to prevent optical traffic propagating at the wavelength associated with the light-trail from passing through the convener node; and wherein the end node is further operable to configure a wavelength-blocking unit of the end node, in response to receiving the setup message, to prevent optical traffic propagating at the wavelength associated with the light-trail from passing through the end node.

7. The optical network of claim 1, wherein each of the convener node and the intervening nodes is operable to store a light-trail table that, when a node is transmitting on the light-trail, identifies a priority associated with the node transmitting on the light-trail, and wherein the convener node and each of the intervening nodes are operable to determine whether a node associated with a higher priority is transmitting based on the light-trail table.

8. The optical network of claim 1, wherein each of the convener node and the one or more intervening nodes is operable to transmit optical traffic by:
    determining whether any node associated with a lower priority is transmitting on the light-trail;
    in response to determining a node having with a lower priority is transmitting on the light-trail, transmit an intimation message to the node associated with the lower priority; and transmitting optical traffic on the light-trail.

9. The optical network of claim 8, wherein the node having the lower priority is operable to terminate a transmission of optical traffic on the light-trail in response to receiving the intimation message.

10. A method for providing optical communication, comprising:
    establishing an optical light-trail between a convener node and an end node in an optical network, wherein the light-trail couples the convener node, one or more intervening nodes, and the end node and is associated with one of a plurality of wavelengths on which an optical network carries optical traffic, wherein establishing the light-trail comprises transmitting, in a control channel associated with a different wavelength than the wavelength associated with the light-trail, a setup message from the convener node to the intervening nodes and the end node;

configuring a wavelength-blocking unit of each intervening node, in response to receiving the setup message at that intervening node, to allow optical traffic propagating at the wavelength associated with the optical light-trail to pass through that intervening node;

determining whether any node having a higher priority than a first node is transmitting on the light-trail;

in response to determining that no other node having a higher priority than the first node is transmitting optical traffic on the light-trail, transmitting optical traffic from the first node to a second node that is located in the light-trail; and indicating to one or more nodes in the light-trail that optical traffic is being transmitted on the light-trail.

11. The method of claim 10, wherein indicating to one or more other nodes comprises transmitting, in a control channel associated with a different wavelength than the wavelength associated with the light-trail, an intimation message from the first node to one or more other nodes.

12. The method of claim 11, wherein indicating to one or more other nodes comprises transmitting an intimation message to all nodes on the light-trail.

13. The method of claim 11, wherein indicating to one or more other nodes comprises transmitting an intimation message to nodes on the light-trail that have a lower priority than the first node.

14. The method of claim 10, wherein determining whether a node having a higher priority is transmitting comprises determining, based on an intimation message previously received by the first node from a node having a higher priority, that the node having a higher priority is transmitting.

15. The method of claim 10, further comprising:
configuring a wavelength-blocking unit of the convener node to prevent optical traffic propagating at the wavelength associated with the light-trail from passing through the convener node; and configuring a wavelength-blocking unit of the end node, in response to receiving the setup message, to prevent optical traffic propagating at the wavelength associated with the light-trail from passing through the end node.

16. The method of claim 10, wherein determining whether a node associated with a higher priority is transmitting comprises determining whether a node associated with a higher priority is transmitting on the light-trail based on a light-trail table that identifies a priority associated with any node currently transmitting on the light-trail.

17. The method of claim 10, further comprising:
determining whether any node associated with a lower priority than the first node is transmitting on the light-trail;

in response to determining that a node associated with a lower priority than the first node is transmitting on the light-trail, transmit an intimation message to the node associated with the lower priority; and transmitting optical traffic from the first node to a second node on the light-trail.

18. The method of claim 17, further comprising terminating a transmission of optical traffic on the light-trail by the node having the lower priority in response to the node having the lower priority receiving the intimation message.

* * * * *